United States Patent
Bazarsky et al.

(10) Patent No.: US 12,093,130 B2
(45) Date of Patent: Sep. 17, 2024

(54) READ LOOK AHEAD OPTIMIZATION ACCORDING TO NVMe DATASET MANAGEMENT HINTS

(71) Applicant: Western Digital Technologies, Inc., San Jose, CA (US)

(72) Inventors: Alexander Bazarsky, Holon (IL); Judah Gamliel Hahn, Ofra (IL); Michael Ionin, Rehovot (IL)

(73) Assignee: Sandisk Technologies, Inc., Milpitas, CA (US)

( * ) Notice: Subject to any disclaimer, the term of this patent is extended or adjusted under 35 U.S.C. 154(b) by 171 days.

(21) Appl. No.: 17/725,367

(22) Filed: Apr. 20, 2022

(65) Prior Publication Data

US 2023/0342244 A1   Oct. 26, 2023

(51) Int. Cl.
 G06F 11/10 (2006.01)
 G06F 3/06 (2006.01)
 G06F 11/07 (2006.01)

(52) U.S. Cl.
 CPC ........ G06F 11/1068 (2013.01); G06F 3/0619 (2013.01); G06F 3/064 (2013.01); G06F 3/0659 (2013.01); G06F 3/0679 (2013.01); G06F 11/0772 (2013.01)

(58) Field of Classification Search
 CPC ............ G06F 11/0772; G06F 11/1068; G06F 3/0619; G06F 3/064; G06F 3/0659; G06F 3/0679
 See application file for complete search history.

(56) References Cited

U.S. PATENT DOCUMENTS

| | | | |
|---|---|---|---|
| 6,507,895 B1 * | 1/2003 | Wang | G06F 12/0862 711/213 |
| 9,977,623 B2 | 5/2018 | Jean et al. | |
| 10,564,853 B2 | 2/2020 | Linkovsky et al. | |
| 10,592,351 B1 | 3/2020 | Desai | |
| 10,811,103 B2 | 10/2020 | Kim | |
| 2005/0154825 A1 * | 7/2005 | Fair | G06F 16/172 711/113 |
| 2008/0109565 A1 * | 5/2008 | Ajanovic | G06F 12/0815 710/8 |
| 2008/0196034 A1 * | 8/2008 | Ajanovic | G06F 1/3203 718/103 |
| 2012/0042123 A1 * | 2/2012 | Kolovson | G06F 12/126 711/E12.019 |

(Continued)

FOREIGN PATENT DOCUMENTS

GB    2612344 A *   5/2023   ........ G06F 12/1458

*Primary Examiner* — Albert Decady
*Assistant Examiner* — Enamul M Kabir
(74) *Attorney, Agent, or Firm* — PATTERSON + SHERIDAN, LLP (57) ABSTRACT

A data storage device includes a memory device and a controller coupled to the memory device. The controller is configured to receive a dataset management (DSM) hint, determine if a second physical memory range associated with a next read operation is located within a threshold number of physical block addresses (PBAs) to a first physical memory range associated with a current read operation, where the next read operation is provided by the DSM hint, and utilize at least a portion of a latency budget associated with the current read operation to optimize a read parameter of the first physical memory range.

20 Claims, 7 Drawing Sheets

(56) References Cited

U.S. PATENT DOCUMENTS

| | | | |
|---|---|---|---|
| 2015/0149818 A1* | 5/2015 | Kalavade | G06F 11/0751 |
| | | | 714/6.13 |
| 2015/0303948 A1 | 10/2015 | Yoon | |
| 2016/0246726 A1* | 8/2016 | Hahn | G06F 3/0613 |
| 2017/0374151 A1* | 12/2017 | Moorthi | H04L 67/1097 |
| 2018/0373626 A1* | 12/2018 | Sun | G06F 12/0246 |
| 2019/0042144 A1* | 2/2019 | Peterson | G06F 3/0635 |
| 2020/0013471 A1 | 1/2020 | Cohen | |
| 2020/0105353 A1 | 4/2020 | Sharon et al. | |
| 2020/0110536 A1* | 4/2020 | Navon | G06F 3/0616 |
| 2020/0301606 A1* | 9/2020 | Muthiah | G06F 3/0659 |
| 2021/0377107 A1 | 12/2021 | Reed et al. | |
| 2022/0083467 A1* | 3/2022 | Sosseh | G06F 12/0246 |
| 2023/0014415 A1* | 1/2023 | Belkar | G06F 13/28 |
| 2023/0222039 A1* | 7/2023 | Madan | G06F 16/172 |
| | | | 707/675 |

\* cited by examiner

READ LOOK AHEAD OPTIMIZATION ACCORDING TO NVMe DATASET MANAGEMENT HINTS

BACKGROUND OF THE DISCLOSURE

Field of the Disclosure

Embodiments of the present disclosure generally relate to data storage devices, such as solid state drives (SSDs), and, more specifically, read look ahead optimization.

Description of the Related Art

A data storage device may be used to store data of one or more host devices coupled to the data storage device. When a host device needs data stored in the data storage device, the host device may generate a read command, where the read command specifies a logical block address (LBA) range of the data to be read. The LBA range corresponds to one or more physical block addresses (PBAs) of a memory device of the data storage device. When the data is read from the one or more PBAs corresponding to the LBA range, the data is transferred back to the host device.

The host device may additionally send a dataset management (DSM) hint through a non-volatile memory (NVM) express (NVMe) interface to the storage device. The DSM hint may indicate to the storage device which LBA range to read next, such that a controller of the data storage device may utilize the DSM hint to read and cache the data associated with the LBA range of the DSM hint from a memory device into a cache. Therefore, when a next read command is received, wherein the data associated with the next read command corresponds to the data of the DSM hint, the controller may provide the data from the cache, rather than reading the data from the memory device. Although the DSM hint may provide the host device with data associated with a next read command quicker, a read using a DSM hint may not be distinguishable from a standard read.

Therefore, there is a need in the art for an improved read operation using a DSM hint.

SUMMARY OF THE DISCLOSURE

The present disclosure generally relates to data storage devices, such as solid state drives (SSDs), and, more specifically, read look ahead optimization. A data storage device includes a memory device and a controller coupled to the memory device. The controller is configured to receive a dataset management (DSM) hint, determine if a second physical memory range associated with a next read operation is located within a threshold number of physical block addresses (PBAs) to a first physical memory range associated with a current read operation, where the next read operation is provided by the DSM hint, and utilize at least a portion of a latency budget associated with the current read operation to optimize a read parameter of the first physical memory range.

In one embodiment, a data storage device includes a memory device and a controller coupled to the memory device. The controller is configured to receive a dataset management (DSM) hint, determine if a second physical memory range associated with a next read operation is located within a threshold number of physical block addresses (PBAs) to a first physical memory range associated with a current read operation, where the next read operation is provided by the DSM hint, and utilize at least a portion of a latency budget associated with the current read operation to optimize a read parameter of the first physical memory range.

In another embodiment, a data storage device includes a memory device and a controller coupled to the memory device. The controller is configured to determine that a received dataset management (DSM) hint indicates that a read look ahead (RLA) read for the first physical memory range will be needed, perform a read recovery flow on a first physical memory range, determine that a decode operation on the first physical memory range has failed, determine that a second physical memory range associated with a next host read is located within a threshold number of physical block addresses (PBAs) to the first physical memory range, perform read level tracking (RLT) on the first physical memory range and the second physical memory range, and adjust a read threshold of the first physical memory range and the second physical memory range.

In another embodiment, a data storage device includes memory means and a controller coupled to the memory means. The controller is configured to apply a result of a read threshold calibration of a first physical memory range to a second physical memory range. A dataset management (DSM) hint provides the controller with the second physical memory range. At least a portion of a latency budget associated with the first physical memory range associated with a current read operation is utilized to perform the read threshold calibration.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, read look ahead optimization. A data storage device includes a memory device and a controller coupled to the memory device. The controller is configured to receive a dataset management (DSM) hint, determine if a second physical memory range associated with a next read operation is located within a threshold number of physical block addresses (PBAs) to a first physical memory range associated with a current read operation, where the next read operation is provided by the DSM hint, and utilize at least a portion of a latency budget associated with the current read operation to optimize a read parameter of the first physical memory range.

Figure 1:
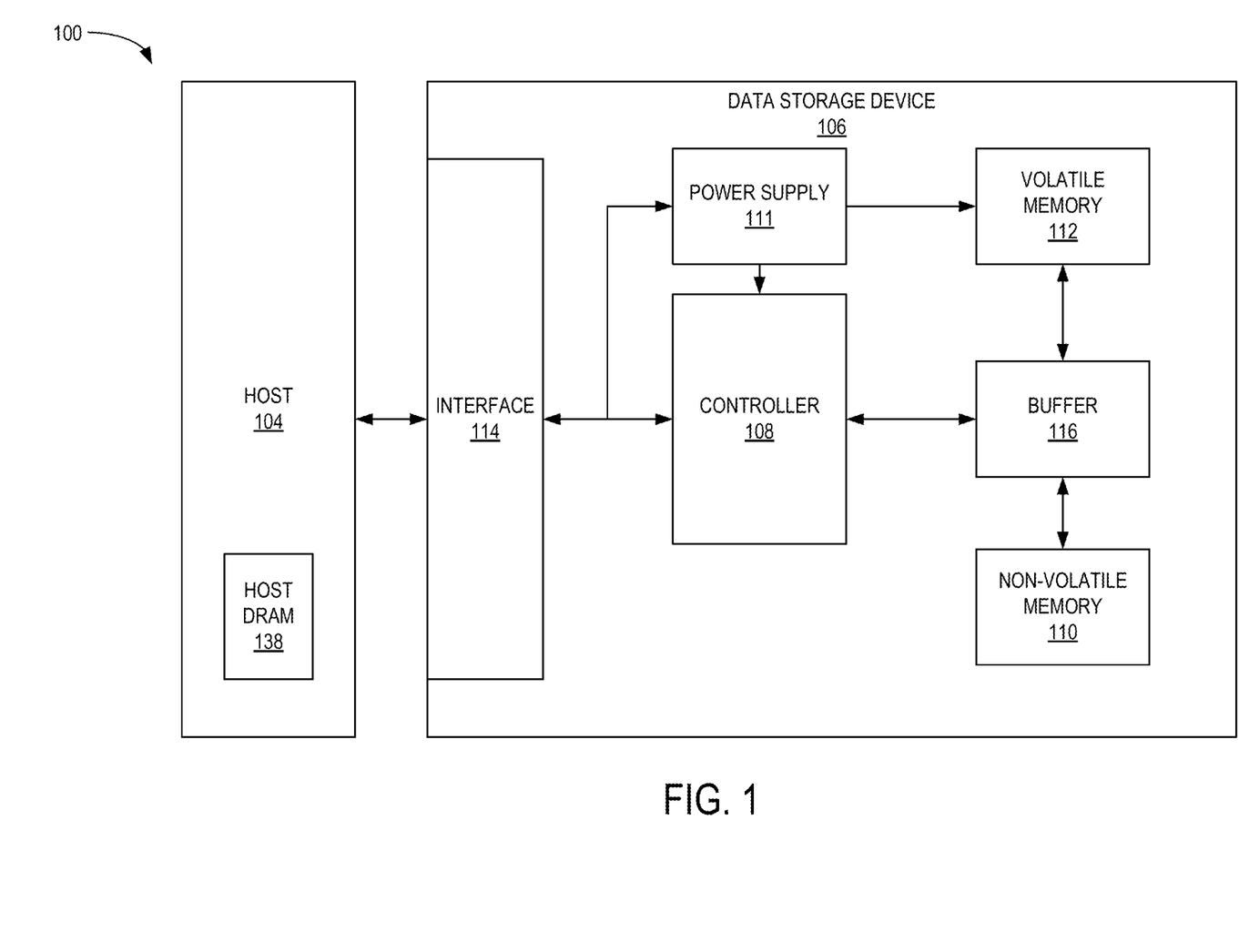
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
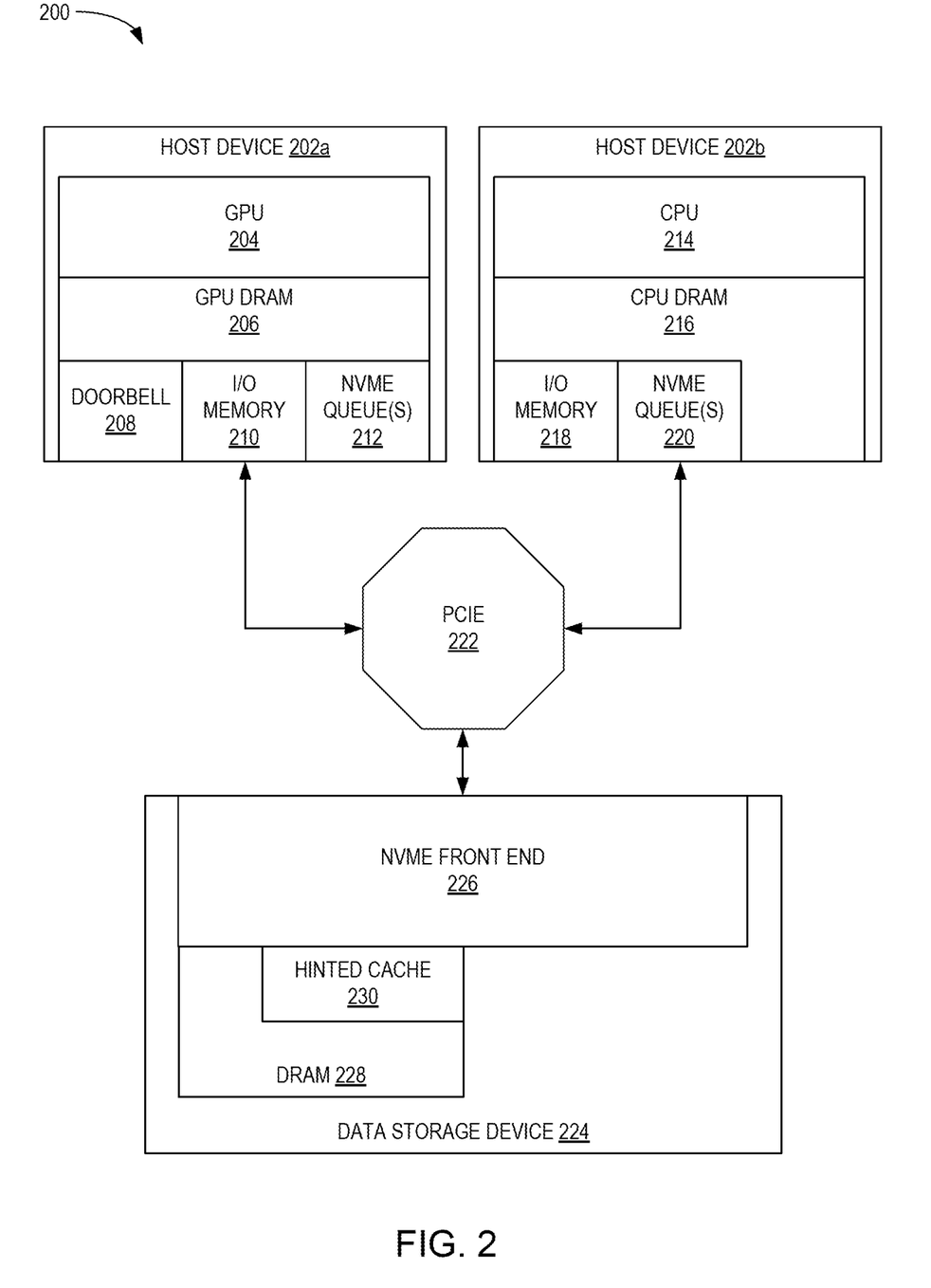
FIG. 2 is a schematic block diagram illustrating a storage system in which a data storage device may function as a storage device for a plurality of host devices, according to certain embodiments.

FIG. 2 is a schematic block diagram illustrating a storage system 200 in which a data storage device 224 may function as a storage device for a plurality of host devices 202a, 202b, according to certain embodiments. The data storage device 224 may the data storage device 106 of FIG. 1. It is to be understood that the number of host devices illustrated is not intended to be limiting, but to provide an example of a possible embodiment.

The plurality of host devices 202a, 202b includes a first host device 202a and a second host device 202b. The first host device 202a includes a graphics processing unit (GPU) 204, a GPU DRAM 206, a doorbell unit 208, an input/output (I/O) memory 210, and one or more NVMe queues 212. The second host device 202b includes a central processing unit (CPU) 214, a CPU DRAM 216, an I/O memory 218, and one or more NVMe queues 220. The plurality of host devices 202a, 202b is coupled to a PCIe interface 222, where the PCIe interface is coupled to the data storage device 224. The data storage device 224 receives or fetches commands from the plurality of host devices 202a, 202b. When a host device includes a doorbell unit, such as the first host device 202a, the doorbell unit 208 may send a doorbell indication to the data storage device 224, where the doorbell indication indicates that the host device 202a has one or more commands to be fetched from the one or more NVMe queues 212. When a host device does not include a doorbell unit, such as the second host device 202b, the second host device 202b may send generated commands from the one or more NVMe queues 220 to the data storage device 224. The I/O memory 210, 218 may be configured to store data associated with read commands and/or write commands.

The data storage device 224 includes an NVMe front end (FE) 226 and a DRAM 228. The DRAM 228 includes a hinted cache 230, where the hinted cache 230 is used for storage of data corresponding to DSM hints. For example, when a host device, such as the first host device 202a, sends a read command that includes a DSM hint to the data storage device 224, where the read command is received at the NVMe FE 226, a controller (not shown), such as the controller 108 of FIG. 1, may read the data associated with the read command and the DSM hint, provide the data associated with the read command to the host device 202a, and store the data associated with the DSM hint in the hinted cache 230. The data storage device 224 may translate an LBA range of the DSM hint to a PBA range using a logical to physical (L2P) table. The L2P table may be managed by a flash translation layer (FTL), where the FTL may be disposed in the controller 108 or coupled to the controller 108. Furthermore, the L2P table may be maintained in volatile memory, such as the volatile memory 112 of FIG. 1, where the volatile memory may be SRAM or DRAM, in a host memory buffer (HMB) in a host DRAM, such as the host DRAM 138 of FIG. 1, or in an NVM, such as the NVM 110 of FIG. 1. In DRAM-less embodiments, such as when the data storage device 224 does not include the DRAM 228, the hinted cache 230 may be stored in other forms of volatile memory, such as an SRAM of the controller 108, or in the HMB of the host DRAM. In embodiments including the DRAM 228, the hinted cache 230 may alternatively be stored in other forms of volatile memory different than DRAM, such as an SRAM of the controller 108.

The data associated with the DSM hint may be read during an idle time during the execution of the read command. The data associated with the DSM hint may be addressed as read look ahead (RLA) data and the associated memory space (e.g., the space in the memory device, such as the NVM 110, where the data is stored) may be addressed as RLA physical memory. The controller may utilize the DSM hint to optimize filling the hinted cache 230 and prepare for the subsequent read. There may be different memory parameters associated with reducing read latency, such as read threshold (RT) voltages, where time saved using the DSM hint may allow for optimization of the RT voltages. The RT voltages may move as a result of changes in physical conditions of the memory cells, such as temperature and wear of the memory cell.

In order to optimize the RT voltages, there are different algorithms employed by the controller in order to reduce error correction code (ECC) decode latency and power consumption. In other words, memory cells having shifted or un-optimized RT voltages may have a higher bit error rate and may require additional power, bandwidth, resources, and the like to read data from the memory cells having the shifted or un-optimized RT voltages. Even if the data is read from the memory cells having the shifted or un-optimized RT voltages, there may be no guarantee that the data is readable, such that that the BER exceeds a threshold, where the BER may be considered an uncorrectable BER (UBER).

Figure 3:
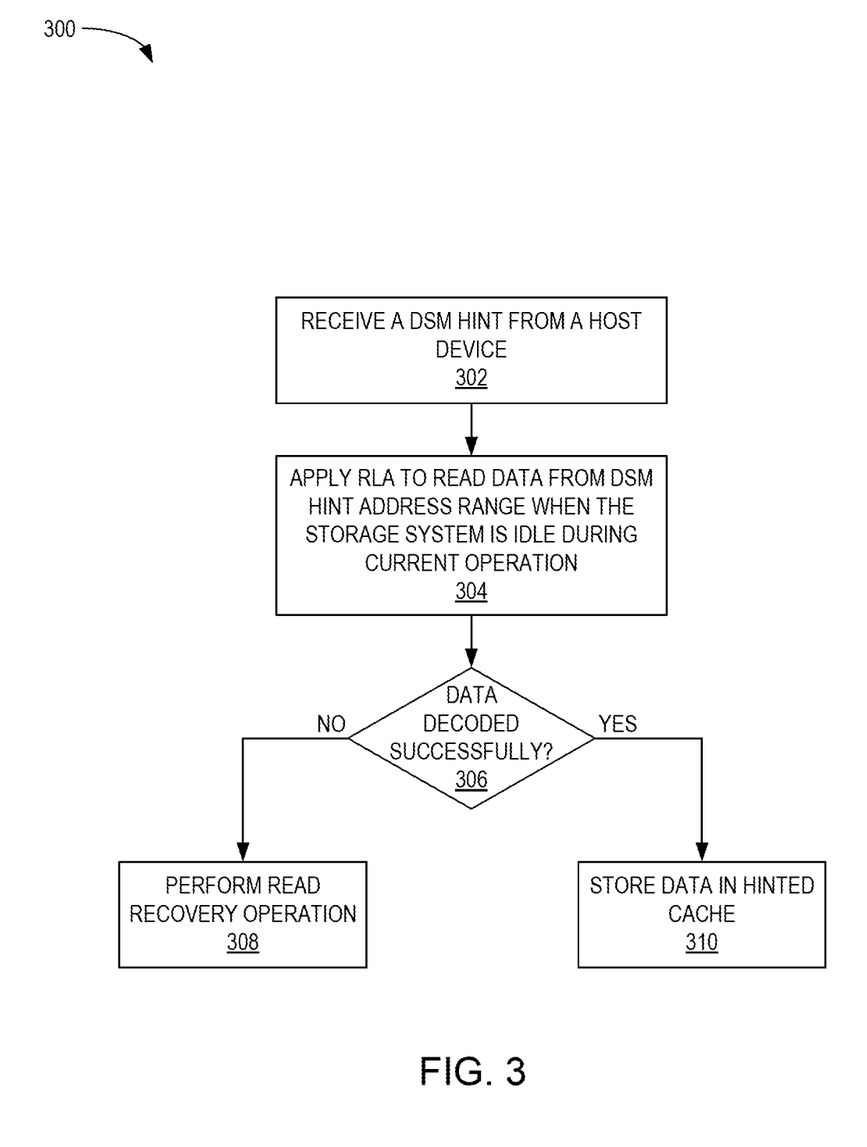
FIG. 3 is a flow diagram illustrating a method of utilizing a DSM hint, according to certain embodiments.

FIG. 3 is a flow diagram illustrating a method 300 of utilizing a DSM hint, according to certain embodiments. Method 300 may be implemented by a controller, such as the controller 108 of FIG. 1. Furthermore, aspects of the storage system 100 of FIG. 1 may be referenced herein for exemplary purposes.

At block 302, the controller 108 receives a DSM hint from the host device 104. At block 304, the controller 108 applies RLA to read data from an address range associated with the DSM hint when the storage system 100 or the data storage device 106 has a period of idle time. The period of idle time may be between processing two or more commands or during processing of a command. When the controller 108 applies RLA to read data from the address range associated the DSM hint, the data is decoded and, if the data is encrypted, de-encrypted. The decoding may include ECC decoding, low-density parity-check (LDPC) decoding, and the like.

At block 306, the controller 108 determines if the data read from the address range associated with the DSM hint has been successfully decoded. If the data from the address range associated with the DSM hint is determined to be unsuccessfully decoded at block 306, then the controller 108 may perform a read recovery operation to the data read from the address range associated with the DSM hint at block 308. Examples of read recovery operations may include, but is not limited to, read threshold calibration, soft bit (SB) decoding, exclusive OR (XOR) recovery, and the like. However, if the data read from the address range associated with the DSM hint is determined to be successfully decoded at block 306, then the data read from the address range associated with the DSM hint is stored in a hinted cache at block 310, such as the hinted cache 230 of FIG. 2.

Figure 4:
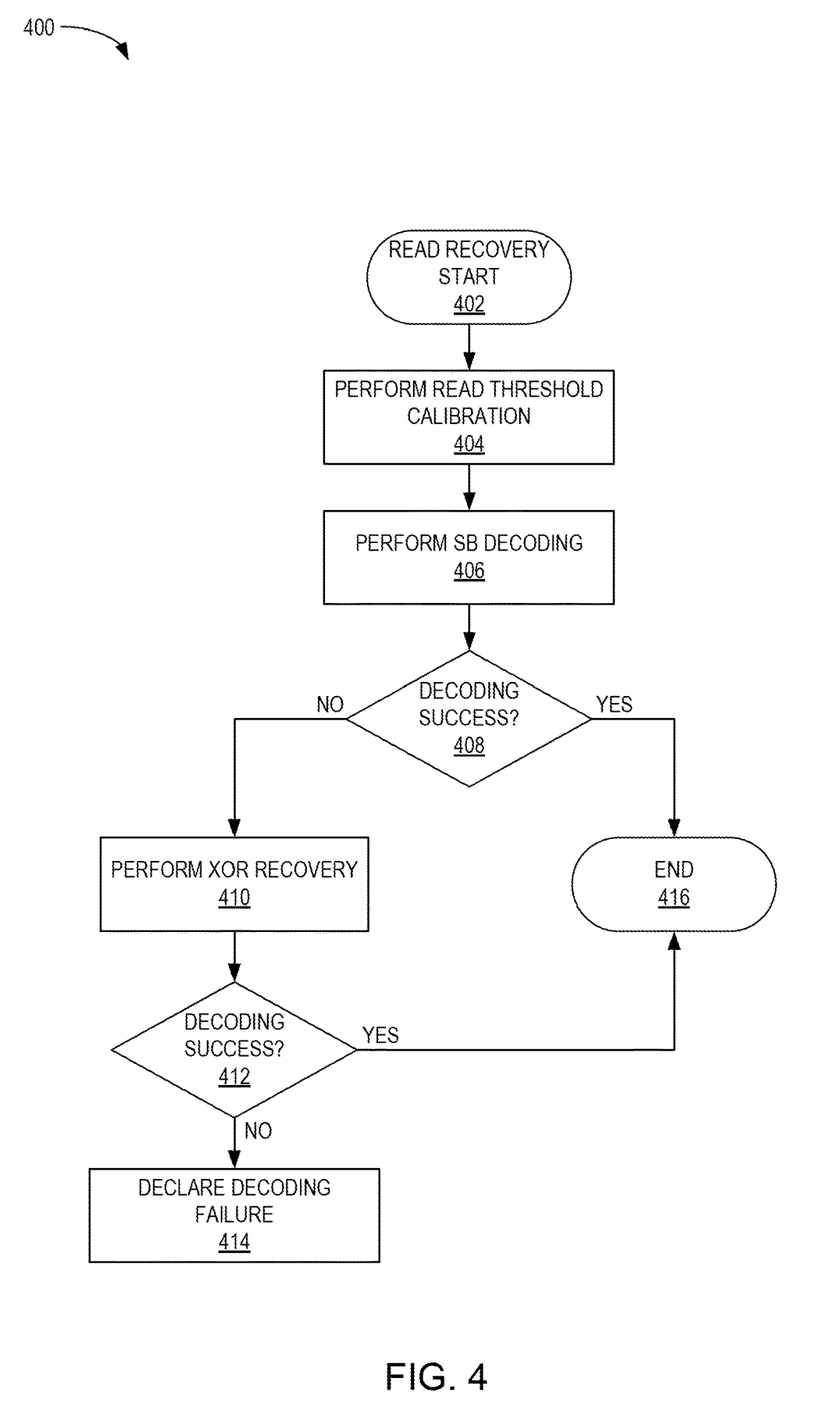
FIG. 4 is a flow diagram illustrating a method of read recovery, according to certain embodiments.

FIG. 4 is a flow diagram illustrating a method 400 of read recovery, according to certain embodiments. Method 400 may be implemented by a controller, such as the controller 108 of FIG. 1. Furthermore, aspects of the storage system 100 of FIG. 1 may be referenced herein for exemplary purposes.

At block 402, the controller 108 begins a read recovery operation on the data that is associated with the decoding failure. For example, block 402 may correspond to block 308 of FIG. 3. Furthermore, the read recovery operation may include read threshold calibration, SB decoding, XOR recovery, and the like. For exemplary purposes herein, the read recovery operation utilized is SB decoding. At block 404, the controller 108 performs read threshold calibration. Read threshold calibration may include shifting one or more read thresholds. Read threshold calibration may also include bit error rate (BER) estimation scan (BES) or valley search. It is to be understood that methods of read threshold calibration are contemplated and may be applicable to the described embodiments. At block 406, the controller 108 performs SB decoding.

At block 408, the controller 108 determines if the SB decoding is successful. If the SB decoding is successful at block 408, the method 400 ends at block 416. However, if the SB decoding is not successful at block 408, then the controller 108 performs XOR recovery on data that is associated with the decoding failure at block 410. At block 412, the controller 108 determines if the XOR recovery is successful. If the XOR recovery is successful at block 412, then method 400 ends at block 416. However, if the XOR recovery is not successful at block 412, then the controller 108 declares a decoding failure at block 414. When the controller 108 declares a decoding failure at block 414, the controller 108 may additionally send a completion failure message to the host device 104 indicating that the data associated with the decoding failure at block 414 cannot be read or retrieved. It is to be understood that the read recovery operations exemplified (e.g., SB decoding and XOR recovery) are not intended to be limiting, but to provide an example of a possible embodiment. Furthermore, additional or less read recovery operations may be employed, which may be dependent on latency demands, bandwidth availability, resource availability, and the like.

Figure 5:
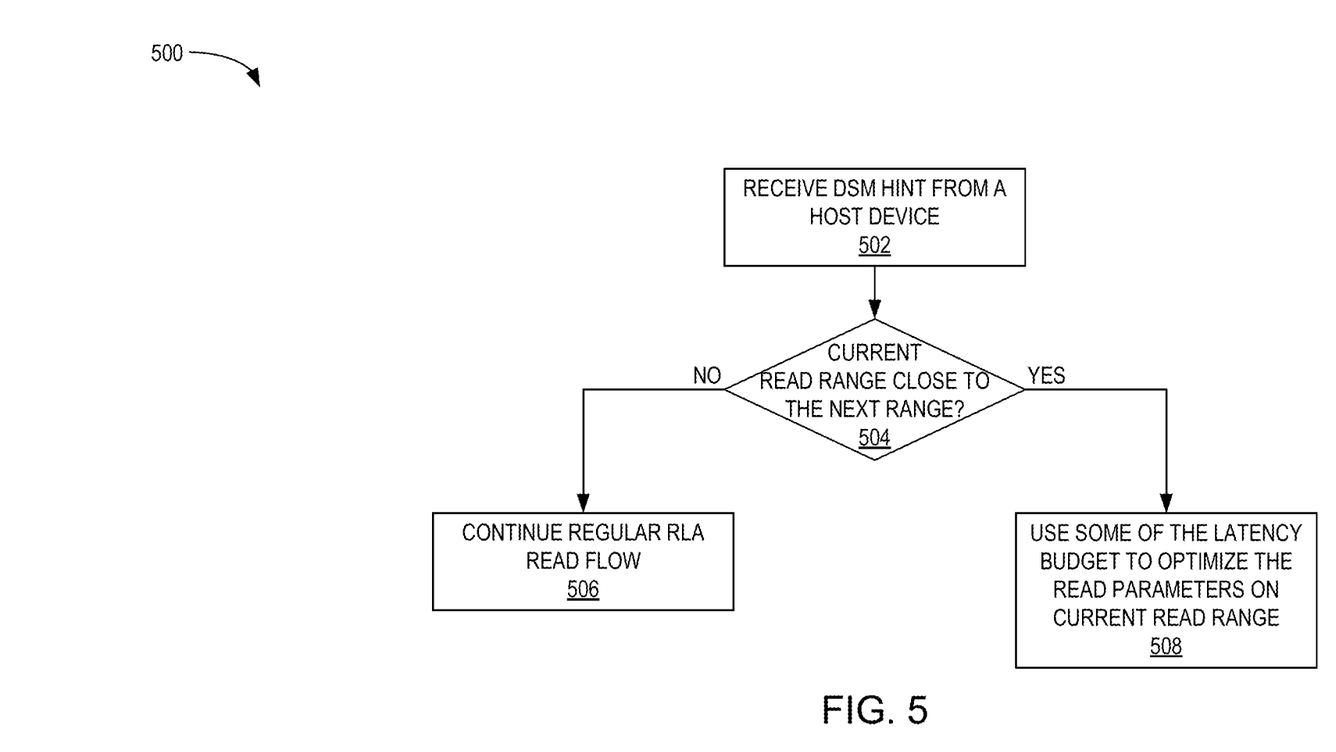
FIG. 5 is a flow diagram illustrating a method of utilizing a DSM hint, according to certain embodiments.

FIG. 5 is a flow diagram illustrating a method 500 of utilizing a DSM hint, according to certain embodiments. Method 500 may be implemented by a controller, such as the controller 108 of FIG. 1. Furthermore, aspects of the storage system 100 of FIG. 1 may be referenced herein for exemplary purposes.

At block 502, the controller 108 receives a DSM hint from the host device 104. At block 504, the controller 108 determines if a current read range (i.e., the PBA range of a read command being processed) is close to a next PBA range associated with the DSM hint. Because the DSM hint includes information regarding a potential next read command, the controller 108 is able to determine if a PBA range corresponding to an LBA range of the DSM hint is next to or relatively close in proximity to a PBA range of the current read command. For example, close in proximity may refer to the PBA range of the potential read command being within a threshold number of PBAs from a read command being processed. Furthermore, the determining may provide whether the current range analysis can be useful to improve the read parameters and reduce read latency and power consumption for the next read range. Additionally, the determining may include comparing the blocks of the PBA range of the potential read command and the blocks of the PBA range of the current read range. The comparing may include determining if the relevant blocks are in the same time and temperature tag, which may indicate that they were written in close proximity in time and/or location and may share the same block characteristics.

If the PBA range associated with the DSM hint is not close in proximity to the current read range at block 504, then the controller 108 continues with the regular RLA read flow at block 506, where data may be read from the PBA range associated with the DSM and stored in the hinted cache 230. However, if the PBA range associated with the DSM hint is close in proximity to the current read range at block 504, then the controller 108 uses some of the latency budget to optimize the read parameters of the current read range at block 508. Because the potential next read range and the current read range may have similar characteristics, such as read thresholds, using a portion of the latency budget to optimize the read parameters of the current read range may improve the read operation of the potential next read range. In other words, the optimized read parameters, such as read thresholds, may be reflected on the potential next read range. For example, optimizing read parameters may include additional operations, such as read level tracking (RLT) operations that may use existing host reads to calibrate read thresholds. The RLT operation may only require a small latency overhead. It is to be understood that using a RLT operation is not intended to be limiting, but to provide an example of a possible embodiment.

Figure 6:
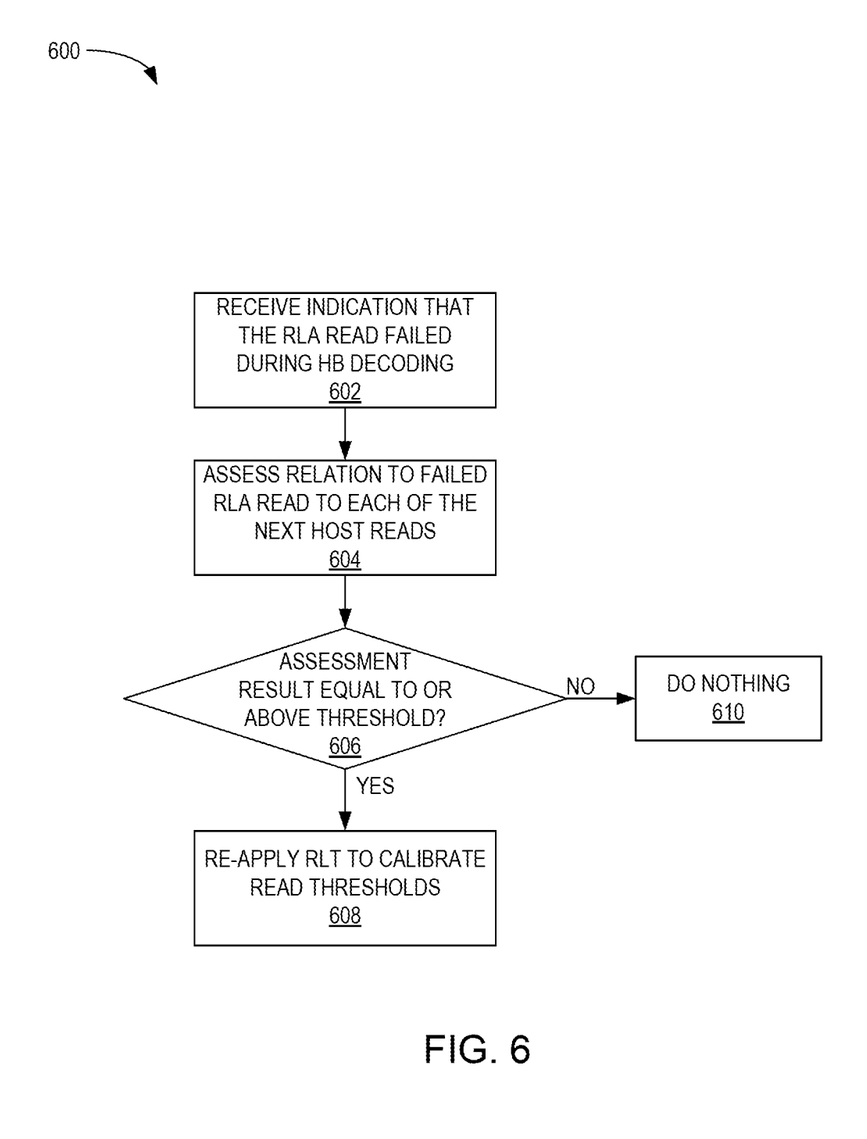
FIG. 6 is a flow diagram illustrating a method of re-calibrating read thresholds, according to certain embodiments.

FIG. 6 is a flow diagram illustrating a method 600 of re-calibrating read thresholds, according to certain embodiments. Method 600 may be implemented by a controller, such as the controller 108 of FIG. 1. Furthermore, aspects of the storage system 100 of FIG. 1 may be referenced herein for exemplary purposes.

At block 602, the controller 108 receives an indication that the RLA read failed during a hard bit (HB) decoding of data associated with a DSM hint. For example, the indication may be received at block 308 of FIG. 3. At block 604, the controller 108 assesses the relation of failed RLA read to each of the next host read commands received. Because the data associated with the DSM hint may not be currently needed, but may be needed in a subsequent operation, the controller 108 may pre-emptively apply measures to mitigate the chances of another HB decoding failure for the same or similar PBA range for the received next host read commands. For example, a similar PBA range may be close in proximity to the current PBA range and/or have a similar time and temperature tag.

At block 606, the controller 108 determines if the assessment result is equal to or above a threshold value. For example, the threshold value may correspond to a relevance of the failed RLA read to the received next host read commands. If the assessment is below the threshold value at block 606, then the controller 108 does nothing at block 610. However, if the assessment is equal to or above the threshold value at block 606, then the controller 108 re-applies RLT to calibrate the relevant read thresholds (e.g., the PBAs corresponding to the failed RLA read) at block 608.

Figure 7:
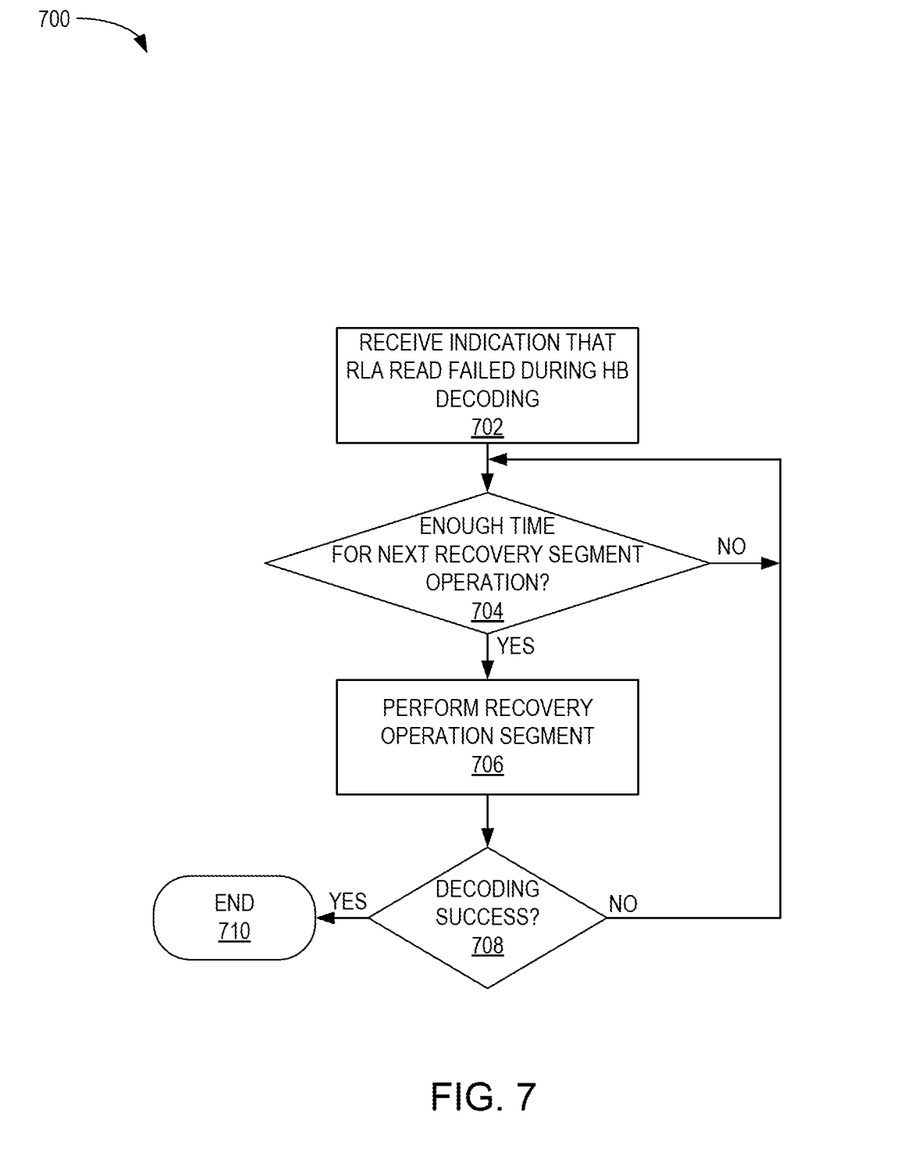
FIG. 7 is a flow diagram illustrating a method of performing recovery segment operations, according to certain embodiments.

When the PBAs associated with the previously failed RLA read is read again, the controller 108 may utilize the results of the RLT operation at block 608 to perform a HB read and attempt a HB decoding of the PBAs associated with the previously failed RLA read. If the HB decoding fails, a regular read recovery flow may be resumed, such as at block 506 of FIG. 5. The data storage device may use knowledge that a certain PBA range has a higher risk of failing a HB decoding attempt and may plan its latency budget accordingly by reordering read commands such that the certain PBA range that has a higher risk of failing the HB decoding attempt has a minimal impact on the overall latency. For example, the controller 108 may reorder the commands such that commands that are expected to have a low latency impact are completed prior to commands that are expected to have a higher latency impact. Thus, the controller 108 may utilize method 700, described below, on the commands that are expected to have a higher latency impact.

FIG. 7 is a flow diagram illustrating a method 700 of performing recovery segment operations, according to certain embodiments. Method 700 may be implemented by a controller, such as the controller 108 of FIG. 1. Furthermore, aspects of the storage system 100 of FIG. 1 may be referenced herein for exemplary purposes. Method 700 may be utilized when a recovery operation of data corresponding to a PBA range of a RLA read that has failed HB decoding is separated into segments, where each of the segments may be performed during an idle time period while performing the read commands of stored in the read queue.

At block 702, the controller 108 receives an indication that a RLA read has failed during HB decoding. The RLA read may be associated with a DSM hint. At block 704, the controller 108 determines if there's enough time for a next recovery segment operation corresponding to recovering the data or optimizing the read thresholds associated with the RLA read that has failed during the HB decoding. The time may refer to a period of idle time. If there is not enough time at block 704, then method 700 loops to block 704, where the controller 108 waits until there is enough time to perform the next recovery segment operation at block 704.

However, if there is enough time at block 704, then the controller 108 performs the relevant recovery operation segment at block 706. It is to be understood that one or more recovery operation segments may be performed during the time at block 706. Each operation of a read recovery operation, such as those described in FIG. 4 above, may be measured or estimated, such that the controller 108 may accurately determine if the current idle period of time allows for a next read recovery operation or segment of a next read recovery operation. The read recovery operations include read threshold calibration, SB read (including SB decoding), XOR recovery, and the like. Because each read recovery operation may have a different time requirement or latency, performing of the read recovery operations may occur in the order from the least time or latency intensive operation to the most time or latency intensive operation. At block 708, the controller 108 determines if a decoding of the data associated with the RLA read that failed HB decoding is successful. The decoding may use the optimized or calibrated read thresholds corresponding to the read recovery operation. If the decoding fails at block 708, then method 700 returns to block 704. However, if the decoding passes at block 708, then method 700 ends at block 710.

By using a portion of the latency budget for storage systems that use read look ahead and DSM hints on physical block address ranges of a next read command that has similar characteristics to the physical block address ranges of a current read command, read performance and quality of service of the data storage device may be improved.

In one embodiment, a data storage device includes a memory device and a controller coupled to the memory device. The controller is configured to receive a dataset management (DSM) hint, determine if a second physical memory range associated with a next read operation is located within a threshold number of physical block addresses (PBAs) to a first physical memory range associated with a current read operation, where the next read operation is provided by the DSM hint, and utilize at least a portion of a latency budget associated with the current read operation to optimize a read parameter of the first physical memory range.

The utilizing occurs when the second physical memory range is located within the threshold number of PBAs to the first physical memory range. The determining comprises comparing PBAs of the first physical memory range to PBAs of the second physical memory range. The comparing comprises comparing a first time tag of the PBAs of the first physical memory range and a second time tag of the PBAs of the second physical memory range. The comparing comprises comparing a first temperature tag of the PBAs of the first physical memory range and a second temperature tag of the PBAs of the second physical memory range. The controller is further configured to perform read level tracking (RLT) on the first physical memory range after optimizing the read parameter of the first physical memory range. The controller is further configured to calibrate a read parameter of the second physical memory range based on the optimized read parameter of the first physical memory range. The controller is further configured to, when the second physical memory range is not located within the threshold number of PBAs to the first physical memory range, determine if a RLA hard bit (HB) decode has failed and determine if a third physical memory range associated with a next host read is located within the threshold number of PBAs to the second physical memory range. The determining comprises comparing the PBAs of the second physical memory range to PBAs of the third physical memory range. The controller is further configured to determine that the third physical memory range is located within the threshold number of PBAs to the second physical memory range and apply read level tracking (RLT) to calibrate a read threshold of the second physical memory range. The calibrated read threshold is applied to the third physical memory range.

In another embodiment, a data storage device includes a memory device and a controller coupled to the memory device. The controller is configured to determine that a received dataset management (DSM) hint indicates that a read look ahead (RLA) read for a first physical memory range will be needed, perform a read recovery flow on a first physical memory range, determine that a decode operation on the first physical memory range has failed, determine that a second physical memory range associated with a next host read is located within a threshold number of physical block addresses (PBAs) to the first physical memory range, perform read level tracking (RLT) on the first physical memory range and the second physical memory range, and adjust a read threshold of the first physical memory range and the second physical memory range.

The next host read is provided in a second received DSM hint. the controller is further configured to determine that another RLA read decode operation has failed, where the another RLA read is on a third physical memory range that is located within the threshold number of PBAs to the first physical memory range or the second physical memory range, perform a HB read on the third physical memory range using the adjusted read threshold, and re-decode the third physical memory range. The controller is further configured to determine that the re-decoding has failed and resume a standard read recovery operation. The controller is further configured to determine that the first physical memory range has a higher risk of failing a hard bit (HB) decode relative to the second physical memory range and re-order one or more next read operations. The controller is further configured to determine if a time remaining exceeds or equals a minimum time threshold, where the minimum time threshold corresponds to a time to perform a recovery operation segment for the first physical memory range, and perform the recovery operation segment on the first physical memory range when the time remaining exceeds or equals the minimum time threshold. The recovery operation segment comprises at least a read threshold calibration, a soft bit (SB) read, a decode of the SB read, and exclusive or (XOR) recovery.

In another embodiment, a data storage device includes memory means and a controller coupled to the memory means. The controller is configured to apply a result of a read threshold calibration of a first physical memory range to a second physical memory range. A dataset management (DSM) hint provides the controller with the second physical memory range. At least a portion of a latency budget associated with the first physical memory range associated with a current read operation is utilized to perform the read threshold calibration.

The second physical memory range is located within a threshold number of physical block addresses (PBAs) to the first physical memory range. The read threshold calibration is a read level tracking (RLT) operation.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive a dataset management (DSM) hint from a host device;
determine if a second physical memory range associated with a next read operation is located within a threshold number of physical block addresses (PBAs) to a first physical memory range associated with a current read operation, wherein the next read operation is provided by the DSM hint;
utilize at least a portion of a latency budget associated with the current read operation to reduce a read latency of a read parameter of the first physical memory range;
determine if a time remaining exceeds or equals a minimum time threshold, wherein the minimum time threshold corresponds to a time to perform a recovery operation segment for the first physical memory range; and
perform the recovery operation segment on the first physical memory range when the time remaining exceeds or equals the minimum time threshold.

2. The data storage device of claim 1, wherein the utilizing occurs when the second physical memory range is located within the threshold number of PBAs to the first physical memory range.

3. The data storage device of claim 1, wherein the determining comprises comparing PBAs of the first physical memory range to PBAs of the second physical memory range.

4. The data storage device of claim 3, wherein the comparing comprises comparing a first time tag of the PBAs of the first physical memory range and a second time tag of the PBAs of the second physical memory range.

5. The data storage device of claim 3, wherein the comparing comprises comparing a first temperature tag of the PBAs of the first physical memory range and a second temperature tag of the PBAs of the second physical memory range.

6. The data storage device of claim 1, wherein the controller is further configured to perform read level tracking (RLT) on the first physical memory range after reducing a read latency of the read parameter of the first physical memory range.

7. The data storage device of claim 6, wherein the controller is further configured to calibrate a read parameter of the second physical memory range based on the reduced read latency read parameter of the first physical memory range.

8. The data storage device of claim 1, wherein the controller is further configured to:
when the second physical memory range is not located within the threshold number of PBAs to the first physical memory range, determine if a RLA hard bit (HB) decode has failed; and
determine if a third physical memory range associated with a next host read is located within the threshold number of PBAs to the second physical memory range, wherein the determining comprises comparing the PBAs of the second physical memory range to PBAs of the third physical memory range.

9. The data storage device of claim 8, wherein the controller is further configured to:
determine that the third physical memory range is located within the threshold number of PBAs to the second physical memory range; and
apply read level tracking (RLT) to calibrate a read threshold of the second physical memory range.

10. The data storage device of claim 9, wherein the calibrated read threshold is applied to the third physical memory range.

11. A data storage device, comprising:
a memory device; and
a controller coupled to the memory device, wherein the controller is configured to:
determine that a received dataset management (DSM) hint indicates that a read look ahead (RLA) read for a first physical memory range will be needed;
perform a read recovery flow on a first physical memory range;
determine that a decode operation on the first physical memory range has failed;
determine that a second physical memory range associated with a next host read is located within a threshold number of physical block addresses (PBAs) to the first physical memory range;
determine if a time remaining exceeds or equals a minimum time threshold, wherein the minimum time threshold corresponds to a time to perform a recovery operation segment for the first physical memory range;
perform the recovery operation segment on the first physical memory range when the time remaining exceeds or equals the minimum time threshold;
perform read level tracking (RLT) on the first physical memory range and the second physical memory range; and
adjust a read threshold of the first physical memory range and the second physical memory range.

12. The data storage device of claim 11, wherein the next host read is provided in a second received DSM hint.

13. The data storage device of claim 11, wherein the controller is further configured to:
determine that another RLA read decode operation has failed, wherein the another RLA read is on a third physical memory range that is located within the threshold number of PBAs to the first physical memory range or the second physical memory range;
perform a HB read on the third physical memory range using the adjusted read threshold; and
re-decode the third physical memory range.

14. The data storage device of claim 13, wherein the controller is further configured to:
determine that the re-decoding has failed; and
resume a standard read recovery operation.

15. The data storage device of claim 11, wherein the controller is further configured to:
determine that the first physical memory range has a higher risk of failing a hard bit (HB) decode relative to the second physical memory range; and
re-order a plurality of next read operations.

16. The data storage device of claim 11, wherein the recovery operation segment comprises at least a read threshold calibration, a soft bit (SB) read, a decode of the SB read, and exclusive or (XOR) recovery.

17. A data storage device, comprising:
memory means; and
a controller coupled to the memory means, wherein the controller is configured to:
apply a result of a read threshold calibration of a first physical memory range to a second physical memory range, wherein:
a dataset management (DSM) hint provides the controller with the second physical memory range; and
at least a portion of a latency budget associated with the first physical memory range associated with a current read operation is utilized to perform the read threshold calibration;
determine if a time remaining exceeds or equals a minimum time threshold, wherein the minimum time threshold corresponds to a time to perform a recovery operation segment for the first physical memory range;
perform the recovery operation segment on the first physical memory range when the time remaining exceeds or equals the minimum time threshold; and
re-order a plurality of read commands based on the result of the read threshold calibration.

18. The data storage device of claim 17, wherein the second physical memory range is located within a threshold number of physical block addresses (PBAs) to the first physical memory range.

19. The data storage device of claim 17, wherein the read threshold calibration is a read level tracking (RLT) operation.

20. The data storage device of claim 17, wherein the plurality of read commands are re-ordered such that a next read command of the plurality of read commands that are expected to have a low latency impact are completed first.

* * * * *